US010668447B2

(12) United States Patent
Zoican-Loebick

(10) Patent No.: US 10,668,447 B2
(45) Date of Patent: Jun. 2, 2020

(54) HIGH CAPACITY REGENERABLE GRAPHENE-BASED SORBENT

(71) Applicant: PRECISION COMBUSTION, INC., North Haven, CT (US)

(72) Inventor: Codruta Maria Zoican-Loebick, North Haven, CT (US)

(73) Assignee: Precision Combustion, Inc., North Haven, CT (US)

( * ) Notice: Subject to any disclaimer, the term of this patent is extended or adjusted under 35 U.S.C. 154(b) by 0 days.

(21) Appl. No.: 16/568,773

(22) Filed: Sep. 12, 2019

(65) Prior Publication Data

US 2020/0001269 A1    Jan. 2, 2020

Related U.S. Application Data

(62) Division of application No. 15/582,813, filed on May 1, 2017, now Pat. No. 10,464,044.

(60) Provisional application No. 62/342,240, filed on May 27, 2016.

(51) Int. Cl.
| | | |
|---|---|---|
| *B01D 53/02* | (2006.01) | |
| *B01J 20/22* | (2006.01) | |
| *B01D 53/04* | (2006.01) | |
| *B01J 20/28* | (2006.01) | |

(52) U.S. Cl.
CPC ............. *B01J 20/22* (2013.01); *B01D 53/04* (2013.01); *B01J 20/28061* (2013.01); *B01J 20/28064* (2013.01); *B01D 2253/20* (2013.01); *B01D 2253/306* (2013.01); *B01D 2257/206* (2013.01); *B01D 2257/708* (2013.01); *B01D 2259/40086* (2013.01)

(58) Field of Classification Search
CPC ............... B01D 53/04; B01D 2253/20; B01D 2253/306; B01D 2257/206; B01D 2257/708; B01D 2259/40086; B01J 20/22; B01J 20/28061; B01J 20/28064
See application file for complete search history.

(56) References Cited

U.S. PATENT DOCUMENTS

| | | |
|---|---|---|
| 5,051,241 A | 9/1991 | Pfefferle |
| 5,282,975 A | 2/1994 | Maryasin |
| 6,156,444 A | 12/2000 | Smith |
| 6,187,823 B1 | 2/2001 | Haddon |
| 6,511,527 B2 | 1/2003 | Yang |
| 6,596,909 B2 | 7/2003 | Nishijima |
| 9,156,701 B2 | 10/2015 | Ho |
| 9,200,804 B2 | 12/2015 | Park |
| 10,017,706 B1 | 7/2018 | Loebick |
| 2003/0024884 A1 | 2/2003 | Petrik |
| 2006/0134096 A1 | 6/2006 | Petrik |
| 2006/0191835 A1 | 8/2006 | Petrik |
| 2009/0220767 A1 | 9/2009 | Schlogl |
| 2011/0133134 A1 | 6/2011 | Varma |
| 2014/0012034 A1 | 1/2014 | Shaffer |
| 2014/0079932 A1 | 3/2014 | Aksay |
| 2014/0113811 A1 | 4/2014 | Stadie |
| 2014/0255283 A1 | 9/2014 | Sidheswaran |
| 2015/0231557 A1 | 8/2015 | Miller |
| 2017/0267538 A1 | 9/2017 | Novek |
| 2018/0133688 A1 | 5/2018 | Losic |
| 2019/0009246 A1 | 1/2019 | Chen |

FOREIGN PATENT DOCUMENTS

| | | |
|---|---|---|
| CN | 105129772 A | 12/2015 |
| RU | 2163840 C1 | 3/2001 |
| WO | WO9408902 A1 | 4/1994 |
| WO | WO2015184816 A1 | 12/2015 |

OTHER PUBLICATIONS

Co-pending, unpublished U.S. Appl. No. 16/008,115, filed Jun. 14, 2018, entitled "Sorbent System for Removing Ammonia and Organic Compounds From a Gaseous Environment"; Inventors: C. Junaedi, C. M. Zoican-Loebick, K. Hawley.
Co-pending, unpublished U.S. Appl. No. 62/839,006, filed Apr. 26, 2019, entitled "Process of Removing Metals From Fluid Hydrocarbons"; Inventors: C. M. Zoican-Loebick, B. Baird, J. Weissman.
M. Bikshapathi, et al., "Fe-nanoparticles dispersed carbon micro and nanofibers: Surfactant-mediated preparation and application to the removal of gaseous VOCs," Colloids and Surfaces A: Physicochemical and Engineering Aspects, vol. 399 (2012), pp. 46-55.
S. Choudhary, H. P. Mungse, and O. P. Khatri, "Dispersion of alkylated graphene in organic solvents and its potential for lubrication applications," Journal of Materials Chemistry, vol. 22 (2012), pp. 21032-21039.
R. Sitko, B. Zawisza, and E. Malicka, "Graphene as a new sorbent in analytical chemistry," Trends in Analytical Chemistry, vol. 51 (2013), pp. 33-43.
H. Schniepp, et al., "Functionalized single graphene sheets derived from splitting graphene oxide," The Journal of Physical Chemistry B, Letters, vol. 110 (2006), pp. 8535-8539.
P. Lazar, et al., "Adsorption of Small Organic Molecules on Graphene," Journal of the American Chemical Society, vol. 135 (2013), pp. 6372-6377.

*Primary Examiner* — Christopher P Jones
(74) *Attorney, Agent, or Firm* — Marie F. Zuckerman; Andrew D. Gathy

(57) ABSTRACT

A process of removing a volatile organic compound (VOC) from a gaseous environment, involving contacting a gaseous feedstream containing one or more VOC's, such as an odoriferous compound, an irritant, a contaminant or pollutant, for example, formaldehyde, with a sorbent under conditions sufficient to reduce the concentration of the VOC's in the gaseous feedstream. The sorbent is comprised of a functionalized graphene prepared by amination of graphene oxide. The sorbent is regenerated by adsorbate desorption under mild conditions of air flow. The process can be run through multiple adsorption-desorption cycles in a single fixed bed or swing bed configuration, and is applicable to purifying indoor air and ventilation air as well as reducing pollutants in industrial waste gas streams.

17 Claims, 8 Drawing Sheets

HIGH CAPACITY REGENERABLE GRAPHENE-BASED SORBENT

CROSS-REFERENCE TO RELATED APPLICATIONS

This application is a divisional of U.S. patent application Ser. No. 15/582,813, filed May 1, 2017, now allowed, which claims the benefit of U.S. Provisional Patent Application Ser. No. 62/342,240, filed May 27, 2016.

GOVERNMENT RIGHTS

This invention was made with support from the U.S. government under Contract No. EP-D-15-040, sponsored by the Environmental Protection Agency. The U.S. Government holds certain rights in this invention.

FIELD OF THE INVENTION

In one aspect this invention pertains to a process of removing volatile organic compounds, hereinafter "VOC's", from a gaseous environment. More specifically, this invention pertains to a process of removing VOC's from a gaseous environment, such as air, wherein the process employs a nanocarbon material as a sorbent, more specifically, a graphene-based nanocarbon material. For purposes of this description, VOC's include odoriferous compounds, skin and eye irritants, contaminants and pollutants. Contaminants and pollutants include a wide variety of chemical compounds, such as formaldehyde, chlorocarbons, and aromatic compounds, whose harmful effects on human health are well documented. Accordingly, the process and composition of this invention provide utility in cleaning air and waste gas streams of unpleasant as well as harmful VOC's.

BACKGROUND OF THE INVENTION

Public policy concerns are growing, especially in the United States, regarding indoor air quality and its impact on human health. Currently, ventilation air (also called "make-up air") is needed to maintain acceptable concentrations of indoor-generated air pollutants. Generally, ventilation air must be conditioned prior to use, such conditioning to include subjection to particle filtration, heating or cooling, and humidification or dehumidification as determined by daily weather and seasonal climate conditions. An estimated 20 to 40 percent of energy consumption in buildings goes into conditioning indoor air, much of it directed to treatment of the ventilation air.

Along similar lines, public policy and environmental concerns continue with respect to outdoor air quality and atmospheric pollution. Waste gas streams from industrial processes generate pollutants in quantities that often do not meet air pollution regulations. Accordingly, national laws require treating industrial waste gases to reduce concentrations of pollutants prior to disposing waste gases into the atmosphere; and such laws might become more stringent in the future.

Prior art in this area of technology discloses sorbents for pollutants from indoor and industrial sources, such sorbents including activated carbon, expanded graphite, zeolites and molecular sieves. A majority of gaseous pollutants including polar volatile organic compounds, indoor formaldehyde being one notable example, are weakly adsorbed by activated carbons. Consequently, polar VOC's are removed via chemical reaction with compounds added to the activated carbon, or more typically, are not removed but diluted with ventilation air to acceptable concentrations. Furthermore, where the sorbent must remove several pollutants from the same environmental gaseous source, activated carbon and zeolites suffer from competitive adsorption wherein easily adsorbed compounds replace and outgas weakly adsorbed compounds. Activated carbons and zeolites are also prone to loss of sorbent capacity and mass through oxidation and attrition during thermal regeneration. Regeneration of activated carbons also poses a fire hazard.

Zeolite sorbents are considerably more expensive than activated carbon, but have the advantage of being environmentally benign, non-flammable and thermally stable. Zeolite sorbents are favored for treatment of waste gases and for processes requiring frequent thermal regeneration. A zeolite, however, cannot provide any adsorption area for molecules larger than its pore size or molecules for which it does not have affinity, because a zeolite's adsorption properties towards specific molecules depend heavily on its silicon to aluminum (Si/Al) ratio, cation type, pore structure and acidity. Furthermore, zeolites typically cannot achieve high rates of adsorption for polar pollutants, such as formaldehyde, and preferentially retain water inside their pores limiting sorption of polar VOC's, such that under a relative humidity typical of indoor air in a range of about 40-55 percent, the retention capacity of zeolite sorbents is significantly reduced.

Carbon nanotubes (CNT's) are known to function as sorbents for removing organic compounds from air, as disclosed in international patent application publication no. WO2012/070886 (Bioneer Corporation); or from a liquid or gas as disclosed in US application publication 2003/0024884 (Petrik); or from an exhaust stream as disclosed in U.S. Pat. No. 6,511,527 (Yang, et al.). CNT's are expensive and difficult to produce in large scale as needed for commercialization. US application publication 2006/0191835 discloses a hydrophobic, non-porous, and carbonaceous nanostructured material, specifically graphene, as a sorbent for contaminants including substituted hydrocarbons, organic solvents, and acids. Such publications are silent with respect to regenerability of the sorbent, except for WO2012/070886 which discloses regenerability of the sorbent by heating at a temperature equal to or higher than a catalytic incineration temperature.

The art would benefit from discovery of an improved sorbent for use in a process of removing one or more volatile organic compounds from a gaseous environment, such as air or industrial waste gas streams. Such a sorbent should desirably provide an improved sorbent capacity, especially towards polar VOC's, as well as good thermal and attrition resistance, and improved regeneration capabilities at lower temperatures, as compared with conventional present day sorbents.

SUMMARY OF THE INVENTION

In a first aspect, we have discovered a novel process of removing a volatile organic compound from a gaseous feedstream, comprising contacting the gaseous feedstream comprising an initial concentration of the volatile organic compound with a sorbent under conditions sufficient to produce an effluent stream comprising a reduced concentration of the volatile organic compound, as compared with the initial concentration. Significantly, the sorbent employed in the process of our invention comprises a novel functionalized graphene prepared by a process comprising, contacting graphene oxide with an amine of the formula $NHR_2$, wherein each R is independently selected from the group consisting of hydrogen, $C_{1-5}$ alkyl, and $C_{1-5}$ aminoalkyl, the contacting occurring under reaction conditions sufficient to produce the functionalized graphene.

In a second aspect, we have discovered a novel sorbent composition comprising a functionalized graphene prepared by a method comprising, contacting graphene oxide with an amine of the formula $NHR_2$, wherein each R is independently selected from the group consisting of hydrogen, $C_{1-5}$ alkyl, and $C_{1-5}$ aminoalkyl, the contacting occurring under reaction conditions sufficient to produce the functionalized graphene.

The aforementioned process of this invention employs a unique nanocarbon sorbent, specifically a functionalized graphene, which allows for markedly improved sorbent capacity for VOC's and improved regenerability at lower temperatures, the latter resulting over time in less thermal degradation and less attrition of the sorbent. Moreover, by varying the kind and degree of the functionalization on the graphene, the sorbent can be tailored to specific target VOC's, such as target pollutants and contaminants present in indoor and ventilation air and present in industrial waste gas streams. Higher sorbent capacity and longer sorbent lifetime correlate with improved clean-up efficiency and better commercial prospects in terms of reduced sorbent and operational costs.

One utility for the process and composition of this invention involves cleaning indoor air; thus, our sorbent is envisioned to be adaptable to present day heating, ventilation, and air conditioning systems (HVAC systems) in conjunction with existing particle filters to directly clean indoor air while decreasing the requirement for costly outside air ventilation. As mentioned hereinbefore, about 20 to 40 percent of energy consumed in U.S. commercial and residential buildings is used for HVAC conditioning. Any reduction in energy consumption and associated costs while reducing the requirement for outside air ventilation beneficially fills a need in the art. In a related aspect, the process and composition of this invention can be employed in purifying air in stand-alone room purification units, for example, as a drop-in replacement for activated carbon. Another utility for the process and composition of this invention involves scrubbing waste gas streams from industrial processes. This application envisions drop-replacing conventional activated carbon scrubbers with the novel sorbent of this invention for increased sorbent capacity and sorbent lifetime.

The graphene-based sorbent of this invention advantageously exhibits an excellent degree of regenerability after the sorbent is saturated or partially saturated with VOC sorbate. Moreover, regeneration is simply accomplished by flushing the saturated or partially saturated sorbent with dry air at ambient or slightly above ambient temperature. This regeneration procedure advantageously results in energy savings by minimizing a need for thermal regeneration at elevated temperatures, such as incineration temperatures, which consume more energy and have associated risks such as flammability of carbon.

Tests performed at higher humidity, up to fifty-five percent relative humidity, on the graphene-based sorbent of this invention showed little to no effect of water on the retention capacity for polar VOC's, an important feature which allows for flexibility in operation. Often, higher humidity negatively affects removal of polar VOC's, particularly formaldehyde, due to competitive adsorption. In this invention, the aforementioned humidity problem is significantly reduced if not eliminated. As a further advantage, the sorbent of this invention beneficially exhibited little to no effect in performance on exposure to carbon dioxide, a ubiquitous component in the environment and more so in industrial waste streams. Accordingly, carbon dioxide does not interfere with the sorption capacity of the sorbent of this invention.

We have discovered that the functionalized graphene sorbent of this invention provides superior performance due to its relatively high surface area and specific chemistry, with added potential for low manufacturing costs in large-scale production. Our discovery further advances the use of our functionalized graphene to overcome limitations to air purification inherent in present day commercial sorbents, notably their loss of capacity due to competitive adsorption, inadequate regenerability, inability to handle multiple classes of contaminants, and low volumetric capacity. Further advantages in sorbent capacity can be accrued by displacing the graphene-based sorbent of this invention onto a variety of supports including fibers, foams, and meshes. The combined improvements in performance of the sorbent of this invention offer benefits heretofore unachieved.

DRAWINGS

DETAILED DESCRIPTION OF THE INVENTION

Figure 1:
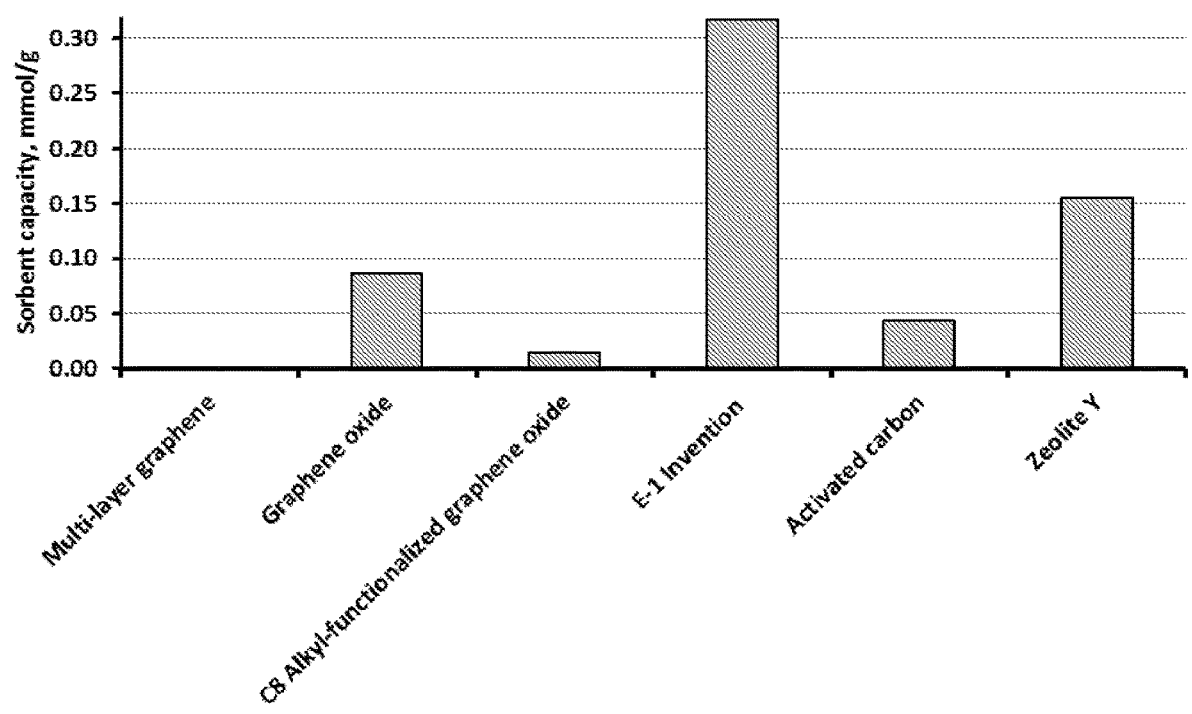
FIG. 1 depicts a bar graph of sorbent capacity of an embodiment of the functionalized graphene sorbent of this invention, as used in the process of this invention and as compared with sorbent capacities of alternative sorbent materials.

In one preferred embodiment, this invention pertains to a novel process of removing a volatile organic compound from a gaseous feedstream, comprising contacting the gaseous feedstream comprising an initial concentration of the volatile organic compound with a sorbent under conditions sufficient to produce an effluent stream comprising a reduced concentration of the volatile organic compound, as compared with the initial concentration. The sorbent employed in this preferred embodiment comprises a novel nitrogen and oxygen-functionalized graphene prepared by a process comprising, contacting graphene oxide with an amine of the formula $NHR_2$, wherein each R is independently selected from the group consisting of hydrogen, $C_{1-5}$ alkyl, and $C_{1-5}$ aminoalkyl, the contacting occurring in the absence of a carbon nanotube and occurring under reaction conditions sufficient to produce the nitrogen and oxygen-functionalized graphene.

In a second preferred embodiment, this invention pertains to a novel sorbent composition comprising a nitrogen and oxygen-functionalized graphene prepared by a method comprising, contacting graphene oxide with an amine of the formula $NHR_2$, wherein each R is independently selected from the group consisting of hydrogen, $C_{1-5}$ alkyl, and $C_{1-5}$ aminoalkyl, the contacting occurring in the absence of a carbon nanotube and occurring under reaction conditions sufficient to produce the nitrogen and oxygen-functionalized graphene.

In yet another preferred embodiment, this invention pertains to a novel sorbent composition comprising a nitrogen and oxygen-functionalized graphene prepared by a method comprising: (a) contacting graphene oxide with an amine of the formula $NHR_2$, wherein each R is independently selected from the group consisting of hydrogen, $C_{1-5}$ alkyl, and $C_{1-5}$ aminoalkyl, the contacting occurring in the absence of a carbon nanotube and occurring under reaction conditions sufficient to produce the nitrogen and oxygen-functionalized graphene; and (b) supporting the nitrogen and oxygen-functionalized graphene on a metal mesh substrate having an ultra-short channel length.

The gaseous feedstream fed to the process of this invention encompasses any gaseous mixture comprising at least one volatile organic compound (VOC) and at least one other gaseous component. For the purposes of this invention, the term "volatile organic compound" is defined to include any chemical compound comprising carbon and hydrogen that has a measurable vapor pressure at ambient temperature and pressure, taken as about 22° C. and about 1 atmosphere (101 kPa). The source of the gaseous feedstream includes in one embodiment indoor air, in another embodiment outdoor air, in yet another embodiment an industrial waste gas stream from any chemical or combustion process. The indoor air may derive from the air within residential and commercial buildings or any other enclosed environment including cabin air as found in an aircraft or spaceship or submarine.

The volatile organic compound is typically present in the gaseous feedstream in a concentration ranging from several parts per billion by volume ($ppb_v$) to many thousands of parts per million by volume ($ppm_v$). Generally, the concentration depends upon the source of the gaseous environment or stream and VOC partial pressure therein. In one embodiment, the volatile organic compound is present as an odoriferous compound, irritant, pollutant or contaminant in air in a concentration ranging from greater than about 1 $ppb_v$ to less than about 100 $ppm_v$, which even at these low concentrations may not satisfy environmental air quality laws. In another embodiment, the volatile organic compound is present in an industrial waste gas stream in a concentration ranging from greater than about 50 $ppm_v$ to less than about 10,000 $ppm_v$ (1 volume percent).

The volatile organic compound may be classified as either polar or non-polar. For purposes of this invention, the term "polar" refers to a chemical compound having a dipole moment of at least about 0.8 Debye (≥0.8 D); whereas the term "non-polar" refers to a chemical compound having a weak dipole moment or no dipole moment, specifically, a dipole moment less than 0.8 D including as low as 0 D. As known in the art, dipole moment is a measure of the electrical polarity of a system of electrical charges. Atoms that provide a dipole moment to a volatile organic compound include, but are not limited to, oxygen, nitrogen, halogen, and sulfur. Suitable non-limiting examples of oxygen-containing substituents that impart a dipole moment to the VOC include hydroxyl, epoxy, acyl, and carboxyl. Suitable non-limiting examples of nitrogen-containing substituents include amine and amide. Suitable non-limiting examples of halogen-containing substituents include fluorine, chlorine, bromine, and iodine; and suitable non-limiting examples of sulfur-containing substituents include thiol, sulfite, sulfate, and thionyl. Purely organic substituents consisting of hydrogen and carbon atoms can also provide a dipole moment to the volatile organic compound depending upon position(s) and number of organic substituent(s), such organic substituents including but not limited to methyl, ethyl, propyl, and higher homologues thereof.

In one embodiment, the volatile organic compound is a polar compound having a dipole moment of at least about 1.5 D. In another embodiment, the volatile organic compound is a polar compound having a dipole moment of at least about 2.0 D. In yet another embodiment, the volatile organic compound is a polar compound having a dipole moment of at least about 2.5 D. At the upper limit the polar VOC typically has a dipole moment less than about 15 D.

The volatile organic compound in one embodiment comprises an odoriferous compound, or an irritant, for example, an irritant towards skin and/or eyes. In another embodiment the volatile organic compound comprises a pollutant or contaminant, which we define as a chemical compound that is classified as noxious, hazardous or otherwise harmful to humans in a concentration greater than an established threshold level. Reference is made herein to the "Toxic and Hazardous Substances" List, Table Z-1, of the Occupational Safety and Health Standards, distributed by the Occupational Safety and Health Administration (OSHA), where the skilled person finds a list of contaminants and pollutants, many of them classifying as polar VOC's, along with their maximum allowable concentration in air. Reference is also made to the "Priority Pollutant List" distributed by the Environmental Protection Agency of the United States, wherein over 126 pollutants are identified. Among these lists are found various non-limiting examples of VOC's including acetaldehyde, acetic acid, acetone, acetonitrile, acrolein, acrylamide, acrylonitrile, allyl alcohol, allyl chloride, aminoethanol, aniline, benzyl chloride, butane thiol, butyl alcohol, butyl amine, chloroacetaldehyde, chlorobenzene, chloroform, cyclohexanol, dichlorobenzene, dichloromethane, dimethylamine, dihydroxymethane, dioxane, ethanethiol, ethyl acetate, ethylamine, formaldehyde, formic acid, methyl mercaptan, methyl acetate, methyl acrylate, methyl bromide, methyl ethyl ketone, phenol, propylene oxide, tetrahydrofuran, and vinyl chloride. It should be appreciated that certain VOC's may be classified into several of the aforementioned categories; for example, an odoriferous VOC or irritant may also be classified as a pollutant or hazardous material. Additionally, it should be appreciated that in another embodiment the gaseous feedstream comprises a mixture of such VOC's.

In one embodiment the volatile organic compound is selected from the group consisting of $C_{1-8}$ oxy-substituted hydrocarbons and $C_{1-8}$ halocarbons and mixtures thereof. Preferred non-limiting examples of $C_{1-8}$ oxy-substituted hydrocarbons include $C_{1-8}$ aldehydes, epoxides, alcohols, carboxylic acids, and mixtures of the aforementioned compounds having from 1 to 8 carbon atoms. In another preferred embodiment, the volatile organic compound is a $C_{1-8}$ aldehyde or a mixture of $C_{1-8}$ aldehydes, such as formaldehyde, propianaldehyde, and butyraldehyde. In yet another preferred embodiment, the volatile organic compound is formaldehyde. Suitable non-limiting examples of $C_{1-8}$ halocarbons include $C_{1-8}$ chlorocarbons, such as carbon tetrachloride, $C_{1-8}$ hydrochlorocarbons, such as methylene dichloride, and $C_{1-8}$ fluorochlorocarbons, such as fluorotrichloromethane.

In addition to the one or more volatile organic compounds, the gaseous feedstream fed to the process of this invention comprises one or more other gases, these including chemical compounds that are not harmful to humans and chemical compounds that may be harmful but do not qualify as a VOC. In one embodiment, the other gases in the feedstream include at least one naturally occurring gas including but not limited to molecular oxygen, nitrogen, water, carbon dioxide, noble gases (helium, neon, argon, krypton, xenon), or any mixture thereof as found, for example, in air. In another embodiment, the other gases in the feedstream include waste gases produced by combustion, which comprise water, carbon monoxide, carbon dioxide, or any mixture thereof.

The relative humidity of the gaseous feedstream fed to the process of this invention ranges from 0 percent to less than about 80 percent, relative humidity being taken as a percentage of water present in the feedstream as compared with a maximum amount of water needed to saturate the feedstream at a standard temperature and pressure, herein taken as 22° C. and 1 atmosphere (101 kPa). A preferred relative humidity of the gaseous feedstream ranges from about 35 to about 70 percent for outdoor air and from about 40 percent to about 50 percent for indoor air.

We have discovered that the sorbent of this invention is essentially non-responsive to carbon dioxide and further that carbon dioxide has essentially no adverse effects on the sorbent. Accordingly, the gaseous feedstream in one embodiment comprises any concentration of carbon dioxide less than 100 volume percent. Consequently, the sorbent of this invention beneficially provides for full use of its capacity towards sorbing VOC's without undesirable loss of capacity towards carbon dioxide sorption.

We have also discovered that the novel sorbent employed in the process of this invention can be prepared generally by contacting graphene oxide with an amine of the formula $NHR_2$, wherein each R is independently selected from the group consisting of hydrogen, $C_{1-5}$ alkyl, and $C_{1-5}$ aminoalkyl, the contacting occurring under process conditions sufficient to prepare a functionalized graphene, more specifically, a nitrogen and oxygen-functionalized graphene. At the start, it should be appreciated that graphene comprises a 2-dimensional crystalline allotrope of carbon in which carbon atoms are densely packed in a regular array of $sp^2$-bonded, atomic scale hexagonal pattern. Graphene can be described as a one-atom thick layer of graphite, as disclosed by H. Schniepp et. al. in "Functionalized Single Graphene Sheets Derived from Splitting Graphite Oxide," The Journal of Physical Chemistry B, Vol. 110, 17, 2006, 8535-8539. Graphene functionalized with oxygen-bearing substituents is frequently referred to as "graphene oxide," which likewise comprises a 2-dimensional crystalline allotrope of carbon in which carbon atoms are densely packed in a regular array of $sp^2$-bonded, atomic scale hexagonal pattern. Graphene oxide, however, further comprises epoxy (/O\) and hydroxyl (—OH) groups bonded to the surface of the graphene sheet as well as carboxyl [—C(O)OH] and hydroxyl (—OH) groups bonded to the edges of the sheet. Generally, the oxygen occurring as a mixture of hydroxyl, epoxy, and carboxyl substituents is present in a concentration greater than about 5 percent, preferably, greater than about 10 percent, by weight, based on the weight of the graphene oxide. Generally, the oxygen is present in a concentration less than about 40 percent, preferably, less than about 30 percent, by weight, based on the weight of the graphene oxide. Of these, the carboxyl functionality represents from 30 to 100 percent by weight of the total oxygen, depending upon how the graphene oxide is prepared.

From another perspective, the concentration of oxygen-containing substituents on the graphene oxide generally ranges from greater than about 5 oxygen-containing groups per 100 carbon atoms to less than about 30 oxygen-containing groups per 100 carbon atoms. The proportion of oxygen substituents converted to nitrogen-containing substituents is typically greater than 5 percent, preferably greater than about 15 percent, and more preferably, greater than about 25 percent, up to essentially 100 percent.

The sorbent of this invention is prepared by first functionalizing graphene with a plurality of the aforementioned oxygen-containing substituent(s), as known in the art, so as to form the graphene oxide, which also may be purchased commercially (e.g., from Angstron Materials); and thereafter, a portion of the aforementioned oxygen-containing substituents is converted to one or more of the nitrogen-containing functionalities. More specifically, graphene oxide is solubilized or suspended in a suitable solvent and reacted with the amine of the formula $NHR_2$, wherein each R is independently defined as noted hereinbefore, at a temperature sufficient to promote the appropriate substitution or thermochemical reaction of the amine with the oxygen functionalities on the graphene. In one preferred synthesis, graphene oxide is reacted with aqueous ammonia (ammonium hydroxide) at a temperature ranging from about 50° C. to about 110° C. for a time ranging from about 5 hours to about 48 hours. The quantity of ammonium hydroxide employed is usually sufficient to convert at least 10 percent and up to 100 percent of the oxygen functionalities to nitrogen functionalities. In another embodiment an excess of ammonium hydroxide relative to oxygen functionalities is employed. Following the thermal treatment, the solution is filtered and the resulting nitrogen and oxygen-functionalized graphene is thoroughly washed with water then dried at a temperature ranging from about 80° C. to 110° C. to obtain the solid nitrogen and oxygen-functionalized sorbent of this invention. Where the amine ($NHR_2$) is an alkylamine or alkyldiamine, a suitable solvent or diluent, such as water or $C_{1-3}$ alcohol, can be employed; or the amine itself acts as the solvent; and the reaction conditions are closely similar to those mentioned above as a person skilled in the art will appreciate.

We believe, although such belief is theory and should not be limiting in any manner, that the amine ($NHR_2$) reacts with the hydroxyl and carboxyl substituents on the graphene oxide giving rise, respectively, to amine (—$NR_2$) and amide [—C(O)$NR_2$] functionalities bonded to the graphene. Additionally, the amine may react with the epoxy substituents on the graphene oxide giving rise to both hydroxyl (—OH) and amine (—$NR_2$) functionalities, although the epoxy groups are considered to be less reactive than the hydroxyl and carboxyl groups. Accordingly, the sorbent of this invention comprises graphene functionalized with a plurality of two types of substituents: (a) an oxygen-containing substituent selected from the group consisting of hydroxyl (—OH), epoxy (/O\) and carboxyl [—C(O)OH], and mixtures thereof; and (b) a nitrogen-containing substituent selected from the group consisting of amine (—$NR_2$), amide [—C (O)NR$_2$], and mixtures thereof, wherein each R again is independently selected from hydrogen, C$_{1-5}$ alkyl, and C$_{1-5}$ aminoalkyl. It is however possible that the sorbent also comprises ionic bonded amine in the form of quaternary ammonium carboxylates represented by [—C(O)O$^{-+}$HNHR$_2$]. Note that even in the instance wherein all hydroxyl, carboxyl, and epoxy groups have reacted with amine, the sorbent product will contain amine, amide, and hydroxyl groups providing for both nitrogen and oxygen-functionalization.

Generally, the nitrogen and oxygen-functionalized graphene sorbent of this invention has a particle size correlating substantially to the particle size of the unmodified graphene oxide from which the sorbent is derived. Since the sorbent and the unmodified graphene oxide are both essentially two-dimensional materials, the thickness of the particles is significantly smaller than the width of the particles. As a guide, when graphene oxide is modified as described hereinabove, the thickness of the resulting nitrogen and oxygen-functionalized graphene ranges from about 1 nanometer (1 nm) to less than about 50 nm, as determined by transmission electron microscopy (TEM) or scanning electron microscopy (SEM). The width of the particles ranges from greater than about 100 nm, preferably, greater than about 200 nm, to less than about 10 microns (μm). Various conventional methods, such as ball-milling, sonication, and thermal annealing, can be employed to modify the size of the particles and/or to select a range of desired particle sizes. The nitrogen and oxygen-functionalized graphene sorbent of this invention generally exhibits a surface area closely similar to the surface area of the graphene oxide starting material. A typical surface area ranges from about 100 m$^2$/g to about 1,000 m$^2$/g, preferably between about 300 m$^2$/g and about 500 m$^2$/g.

In another embodiment the sorbent of this invention further comprises one or more catalytic metals, including for example metals capable of catalyzing oxidation reactions, such as the Group VIII metals of the Periodic Table as well as copper and manganese (e.g., MnO$_2$). In another embodiment, the sorbent incorporates a bioactive material that can biologically degrade the volatile organic compound after adsorption onto the sorbent.

The sorbent of this invention is provided to the adsorption process in any of a variety of physical forms including but not limited to powders, pellets, extrudates, or as a layer, laminate or coating on a non-porous or macroporous support, such supports to include ceramic and metallic fibers, meshes, and foams. The term "macroporous" refers to pores, channels, or void spaces having a critical dimension larger than about 0.5 micron (>0.5 μm), and preferably, larger than about 25 μm. In one embodiment, the sorbent is provided as a layer or a coating covering a support in the form of a wall or surface of the sorbent bed or pellets or extrudates filling the bed. In another embodiment, the sorbent is applied to a high surface area support, such as a support having a surface area of at least about 100 m$^2$/g, for the purpose of increasing access of the gaseous feedstream to the sorbent as well as decreasing pressure drop across the sorbent bed. In yet another embodiment, the sorbent further comprises a binder, which functions to impart an acceptable degree of cohesiveness and attrition resistance to the sorbent. Supports and binders for sorbents and catalysts are known to the person skilled in the art.

In yet another embodiment, the sorbent comprises a layer or coating of the nitrogen and oxygen-functionalized graphene sorbent on a high surface area support comprising an ultra-short-channel-length mesh, preferably, a Microlith® brand ultra-short-channel-length metal mesh available from Precision Combustion, Inc., North Haven, Conn. A description of the aforementioned mesh can be found in U.S. Pat. Nos. 5,051,241, and 6,156,444, both patents incorporated herein by reference. Generally, the ultra-short-channel-length mesh is provided as a low thermal mass monolith of ultra-short-channel-length, in contrast to prior art monoliths having longer channel lengths. For the purposes of this invention, the term "ultra-short-channel-length" refers to a channel length in a range from about 25 microns (μm) (0.001 inch) to about 500 m (0.02 inch). Thus, in visual appearance the preferred mesh of ultra-short-channel-length resembles a net or screen. In contrast, the term "long channels" pertaining to prior art monoliths refers to channel lengths greater than about 5 mm (0.20 inch) upwards of 127 mm (5 inches).

The loading of sorbent onto any support can be described in units of weight sorbent per unit volume of support; and this advantageously ranges from about 2 mg sorbent per cubic centimeter support (2 mg/cm$^3$) to about 60 mg/cm$^3$. This description takes gross dimensions of the support into account. The thickness and uniformity of the sorbent coating on the support vary depending upon the specific support, sorbent, and coating method selected.

It should be appreciated that in one preferred embodiment, the nitrogen and oxygen-functionalized sorbent composition of this invention excludes any microporous and mesoporous co-sorbent, including any co-sorbent carbon nanotube (CNT), zeolite, molecular sieve, activated carbon, or mixture thereof. Such co-sorbents typically contain a regular or irregular system of tubes, pores, channels, or void spaces having a critical dimension ranging from about 0.5 nanometer (0.5 nm) to about 50 nm, which we find undesirable for two reasons. Firstly, such microporous and mesoporous co-sorbents are limited to trapping only VOC's that fit within their tubular or pore system, that is, those VOC's with dimensions smaller than the dimensions of the tubes, pores, channels, or void spaces. Secondly, VOC's that enter the tubular or pore system may find it difficult to exit. As a consequence, regenerating microporous and mesoporous co-sorbents is difficult resulting in undesirable loss in sorbent capacity. Additionally, CNT's in particular are difficult to fabricate in large scale thereby adding unnecessary costs of manufacture. In contrast, our nitrogen and oxygen-functionalized graphene sorbent is prepared in one simple, cost effective step; is essentially non-porous (i.e., essentially does not contain pores and channels), and shows excellent regenerability.

In terms of operation, in one embodiment the process of this invention is conducted in a single sorbent bed where in adsorption mode a flow of gaseous feedstream containing at least one VOC in an initial concentration is contacted with the sorbent for a time during which an effluent stream exiting the sorbent bed contains an acceptably reduced concentration of the VOC. When the sorbent bed is fully or partially saturated and the effluent stream contains an unacceptable concentration of the VOC (otherwise known as "breakthrough"), the flow of gaseous feedstream to the bed is stopped. Thereafter, the sorbent is regenerated by running the bed in desorption mode either by heating the sorbent bed, or by decreasing pressure, e.g., pulling a vacuum on the sorbent bed, or by passing a sweep gas through the sorbent bed at selected temperature and pressure to drive off the adsorbed VOC, which is typically collected in a containment vessel or exhausted into an exterior atmosphere. Suitable sweep gases include air, nitrogen, carbon dioxide, helium, argon, and the like, with air being a preferred sweep gas. Thereafter, the process involves alternating the sorbent bed between adsorption and desorption modes over many reiterations. In one embodiment, regeneration is accomplished by exposing the sorbent to a high space velocity flow of air at room temperature.

In another embodiment a plurality of sorbent beds is engaged in swing mode operation such that one or more sorbent beds are operated in adsorption mode, while one or more other sorbent beds are simultaneously operated in desorption mode. As the beds operating in adsorption mode reach the desired partial or full saturation, the bed operations are switched such that the bed(s) originally operating in adsorption mode are engaged in desorption mode, while the bed(s) originally operating in desorption mode are converted to adsorption mode. Temperature swing operation involves cycling the beds between a temperature suitable for effecting adsorption and a temperature, usually a higher temperature, suitable for effecting desorption. Pressure swing operation involves cycling the beds between a pressure gradient, for example, exposure to the VOC at normal pressure to effect adsorption and exposure to a vacuum to effect desorption. Swing bed technology is known in the art and advantageous in eliminating downtime while a bed is regenerated.

Valves for directing the flow(s) into and out of each sorbent bed can be any of those commercially available flow control valves known to a person skilled in the art. Likewise, valves for exposing each sorbent bed to a pressure gradient include any of such pressure control valves that are known to a skilled person and generally available commercially. The term "pressure gradient" means that the pressure control valve connects two environments at different pressure; for example, the pressure of the contaminant in the sorbent bed when the bed is loaded may be higher than the pressure of the contaminant in an environment outside the sorbent bed. Accordingly, the contaminant can be desorbed from the sorbent bed by opening the relevant valve and exposing the sorbent bed to a lower pressure environment. Sensors detecting a concentration of the contaminant in each sorbent bed or in an effluent stream from each sorbent bed can be any commercially available sensor suitable for detecting the contaminant of interest. Such sensors include, for example, flame ionization detectors and thermal conductivity detectors. Finally, the controller responsive to the sensor(s) or a predetermined time period for controlling operation of the plurality of valves can be obtained commercially or constructed by a person skilled in the art.

The adsorption-desorption process of this invention is conducted under any process conditions providing for acceptable removal or reduction of the one or more VOC's from the gaseous feedstream. Specific process conditions are determined by the selected VOC and heat and mass balance considerations. The following process conditions are presented for guidance purposes; however, other process conditions may be operable and more desirable depending upon the specific VOC(s). The adsorption cycle is operated advantageously at a sorbent bed temperature ranging from about 5° C. to about 50° C. and a pressure ranging from about 1 atm (101 kPa) to about 5 atm (506 kPa). In a preferred embodiment, the adsorption cycle is operated at ambient temperature and pressure, taken as 22° C. and 1 atm (101 kPa). Advantageously, during the adsorption cycle the gaseous feedstream containing the one or more volatile organic compounds is fed to the sorbent bed at a gas hourly space velocity ranging from about 100 ml total gas flow per ml sorbent bed per hour ($hr^{-1}$) to about 100,000 $hr^{-1}$. The desorption cycle is beneficially operated at a temperature ranging from about ambient, taken as 22° C., to about 200° C., but preferably operates between ambient and about 50° C. Advantageously, the desorption cycle is operated at a total pressure ranging from about 0.0005 atm (0.05 kPa) to about 1 atm (101 kPa). Typically, each regeneration cycle recovers more than 50 percent of the previous cycle's sorbent capacity.

In adsorption mode, the process of this invention achieves a lower concentration of VOC's in the effluent stream exiting the sorbent bed(s) as compared with the concentration of VOC's in the feedstream fed to the bed. Generally for air ventilation applications the concentration of each contaminant or pollutant VOC in the effluent stream is advantageously less than about 50 parts per million by volume ($ppm_v$), preferably, less than about 25 $ppm_v$, more preferably, less than about 1 $ppm_v$, and most preferably, less than about 100 parts per billion by volume ($ppb_v$), based on the total volume of the effluent stream exiting the adsorption bed. Generally, for smoke stack or industrial process applications, the concentration of each contaminant in the effluent stream is less than about 8,000 parts per million by volume ($ppm_v$), preferably, less than about 5,000 $ppm_v$, more preferably, less than about 500 $ppm_v$, even more preferably, less than about 50 $ppm_v$, even more preferably, less than about 10 $ppm_v$, and most preferably, less than the minimum detectable concentration.

One important characteristic of the novel sorbent of this invention should be fully appreciated for distinguishing our invention from sorbents already known in the art. Specifically, the sorbent of this invention exhibits excellent regenerability under very mild conditions, namely, under a flow of a sweep gas at ambient temperature (22-25° C.) and ambient pressure (about 101 kPa). This allows for our sorbent to be regenerated at ambient conditions with clean air, i.e., air containing a non-detectable concentration of any pollutant or contaminant. We have further discovered that our sorbent can be cycled through at least about 4 adsorption-desorption cycles without losing more than 20 percent of its original capacity, when the sorbent is provided as a powder. In contrast, sorbents of the prior art typically require thermal regeneration at temperatures considerably higher than ambient temperature.

EMBODIMENTS

Example 1 (E-1)

A rig for adsorption and desorption testing was constructed as follows. A single fixed sorbent bed comprising a cylindrical tube [stainless steel, 1.5 inch inner dia. (3.8 cm), 10 inch length (2.5 cm)] was fitted at each end with a flow line and conventional flow control valves, on the upstream end for controlling a flow of gaseous feedstream into the bed and on the downstream end for exiting an effluent flow from the bed. The tube was provided with a voltage controller and wrapped with a heating tape so as to provide heating to the bed. A humidity control was connected to the upstream flow line to provide gaseous water to the feedstream. The downstream effluent line was connected to a gas chromatograph and a formaldehyde detector (Interscan Corp., RM Series).

A sorbent (700 mg) of nitrogen and oxygen-functionalized graphene was employed, which ensured no by-pass or channeling of contaminated air through the sorbent bed. The sorbent was prepared by thermal treating a commercial graphene oxide with aqueous ammonium hydroxide as follows. The graphene oxide powder (Angstron Materials, catalog number N002-PDE) comprised a few-layer graphene oxide platelets with a thickness of 2-3 nanometers (2-3 nm); a lateral dimension of approximately 7 micrometers (7 μm); a carbon content of 60-80 percent; oxygen content between 10-30 percent; and a surface area of 420 m²/gm.

The graphene oxide powder was mixed in a flask with excess aqueous ammonium hydroxide (30 wt. percent solution) in a ratio of 30 g ammonium hydroxide solution per gram graphene oxide. The mixture was heated to 90-100° C. under reflux for 48 h. Periodically, the level of the mixture was checked and replenished as needed, as some ammonia gas was released from solution under the reaction conditions. At the end of the 48 h a solid product was recovered by filtration, and the solid was washed with deionized water until the pH of the filtrate was measured at neutral. The solid was further dried at 70° C. overnight to yield the sorbent of this invention as a powder.

A contaminant gas comprising air and formaldehyde (30 ppm, Air Liquid Specialty Gases) was diluted with uncontaminated air in a quantity sufficient to deliver a feedstream mixture comprising air and formaldehyde (10 ppm) to the sorbent bed. The formaldehyde concentration of 10 ppm was chosen to ensure a relatively fast break-through for timely analysis. Although OSHA's short-term exposure limit for formaldehyde is no greater than 2 ppm total over 15 minutes, we chose a higher concentration to ensure that the break-through was sufficiently fast to allow for multiple experiments within an acceptable time frame.

Operating conditions during adsorption mode were as follows: inlet pressure of the feedstream to the sorbent bed, 2-3 psig (14-21 kPa); temperature of the sorbent bed, ambient, taken as 22° C.; flow rate, 0.75 standard liters contaminated air per minute; relative humidity of the contaminated air, 10 percent. Break-through was defined as the point at which the concentration of formaldehyde in the effluent stream equaled 50 percent of the inlet formaldehyde concentration, namely, 5 ppm. Note that conditions under which our apparatus was tested were not optimized for mass transfer from the contaminated air to the sorbent. Supporting the sorbent on a higher surface area substrate, such as pellets or metal mesh rather than providing the support as a powder, is expected to increase sorbent capacity.

Figure 2:
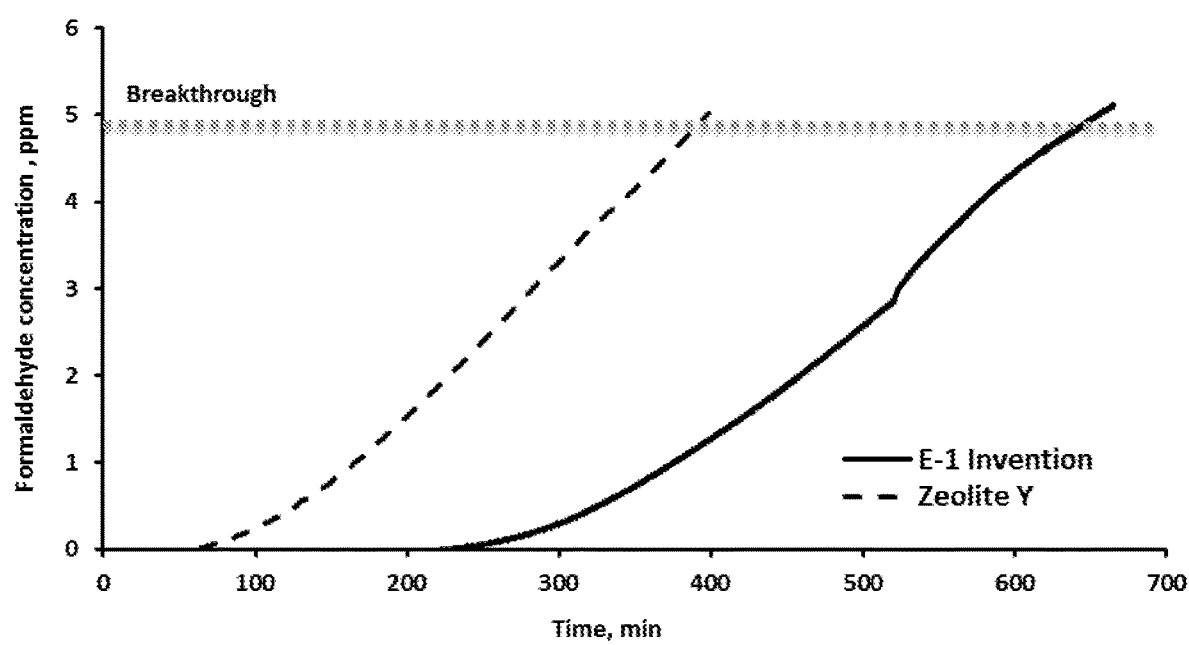
FIG. 2 depicts a graph of formaldehyde break-through as a function of time for an embodiment of the process of this invention, as compared with a comparative process.

FIG. 1 depicts a bar graph of the capacity of the functionalized graphene sorbent for formaldehyde. Under the test conditions the sorbent capacity was 0.32 mmoles $CH_2O$/g sorbent. FIG. 2 depicts a graph of formaldehyde break-through as a function of time. It was found that formaldehyde break-through occurred at about 650 minutes.

Comparative Experiment 1 (CE-1 (a-e))

For comparative purposes, the process of Example 1 was repeated five times, each time with the exception that the nitrogen and oxygen-functionalized graphene sorbent of Example 1 was replaced with a comparative sorbent material, specifically the following: (1a) multi-layer graphene (Angstron Materials, 40 m²/g)); (1b) graphene oxide (Angstron Materials, 400 m²/g); (1c) graphene oxide functionalized with $C_8$-alkylamide substituents, prepared from graphene oxide using thionyl chloride reaction followed by reaction with octylamine; (1d) activated carbon (Spill X, 1,400 m²/g); and (1e) zeolite Y (Sigma-Aldrich, 600 m²/g).

FIG. 1 depicts a bar graph of the sorbent capacity of each of the comparative sorbents for formaldehyde. It was found that under the test conditions the sorbent capacity was considerably less for each of the comparative sorbents: multi-layer graphene, graphene oxide, $C_8$-alkylamide functionalized graphene oxide, activated carbon, and zeolite Y, as compared with the sorbent of this invention exemplified in E-1.

FIG. 2 depicts a graph of formaldehyde break-through as a function of time for the zeolite Y comparative sorbent, which was the best of the comparative sorbents. It was found that formaldehyde break-through occurred at about 380 minutes, which was a considerably shorter time than that observed for the sorbent of this invention exemplified in E-1.

Example 2 (E-2)

The process of the invention was evaluated under conditions of multiple adsorption-desorption cycles for the purpose of evaluating regeneration capacity of the sorbent of the invention exemplified in E-1. The apparatus and test conditions were similar to Example E-1 with some exceptions. In order to achieve faster formaldehyde break-through to achieve multiple adsorption-desorption cycles within a reasonable time frame, the formaldehyde concentration in air was decreased from 10 ppm as used in E-1 to 7.5 ppm for this example. In addition, the space velocity of the contaminant feedstream was increased from 0.75 slpm as used in E-1 to 1.4 slpm in this example. The amount of sorbent was decreased from 700 mg as used in E-1 to 100 mg in this example. These modifications of the test method ensured contaminant break-through within approximately 1 h allowing for a more rapid testing procedure. Break-through was again defined as the point at which the outlet contaminant concentration increased to 50 percent of the original inlet contaminant concentration. During the adsorption cycle, pressure and temperature test conditions were similar to those used in E-1. Each desorption (regeneration) cycle was effected by flushing the sorbent with clean air. The flow rate, pressure, temperature, and time of the desorption cycles are presented for each desorption cycle in Table 1.

TABLE 1

Regeneration Test Matrix

| Cycle | Air flowrate, slpm | Pressure, kPa | Temperature, ° C. | Time, min |
|---|---|---|---|---|
| 1 | 1.4 | 20.7 | 25 | 210 |
| 2 | 1.4 | 20.7 | 25 | 210 |
| 3 | 1.4 | 20.7 | 25 | 210 |

Figure 3:
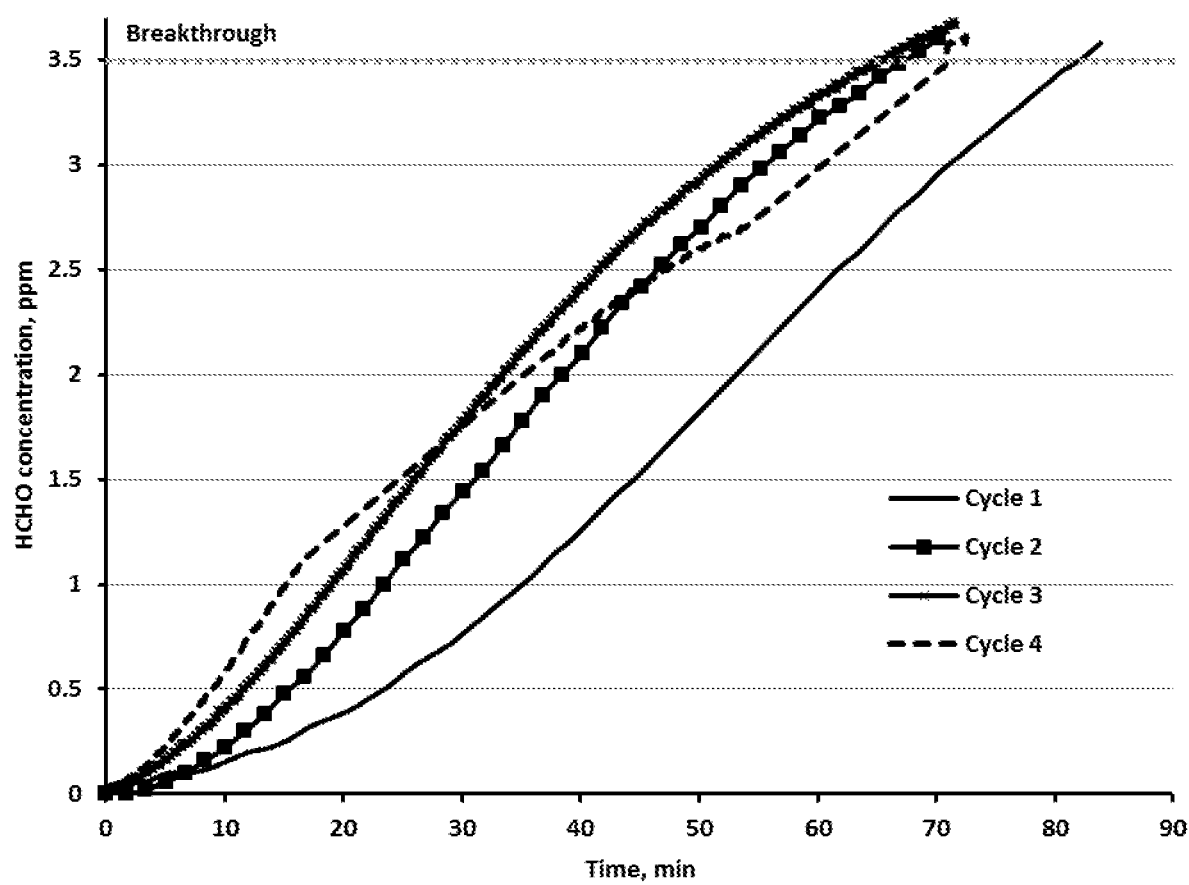
FIG. 3 depicts graphs of formaldehyde break-through as a function of time for an embodiment of the process of this invention cycled through four adsorption-desorption cycles.
Figure 4:
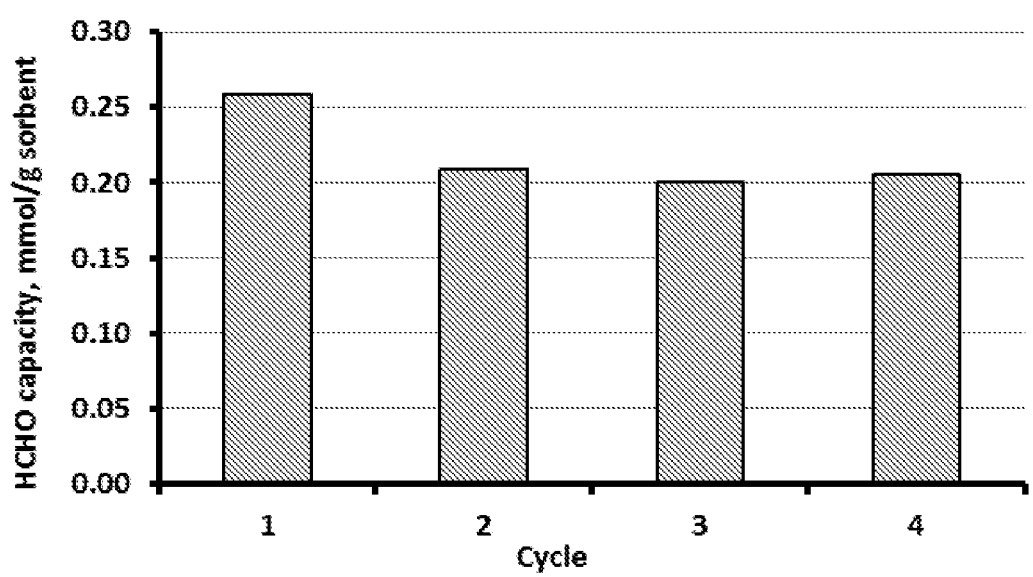
FIG. 4 depicts a bar graph of sorbent capacity of an embodiment of the functionalized graphene sorbent of this invention, as used in the process of this invention cycled through four adsorption-desorption cycles.
Figure 5:
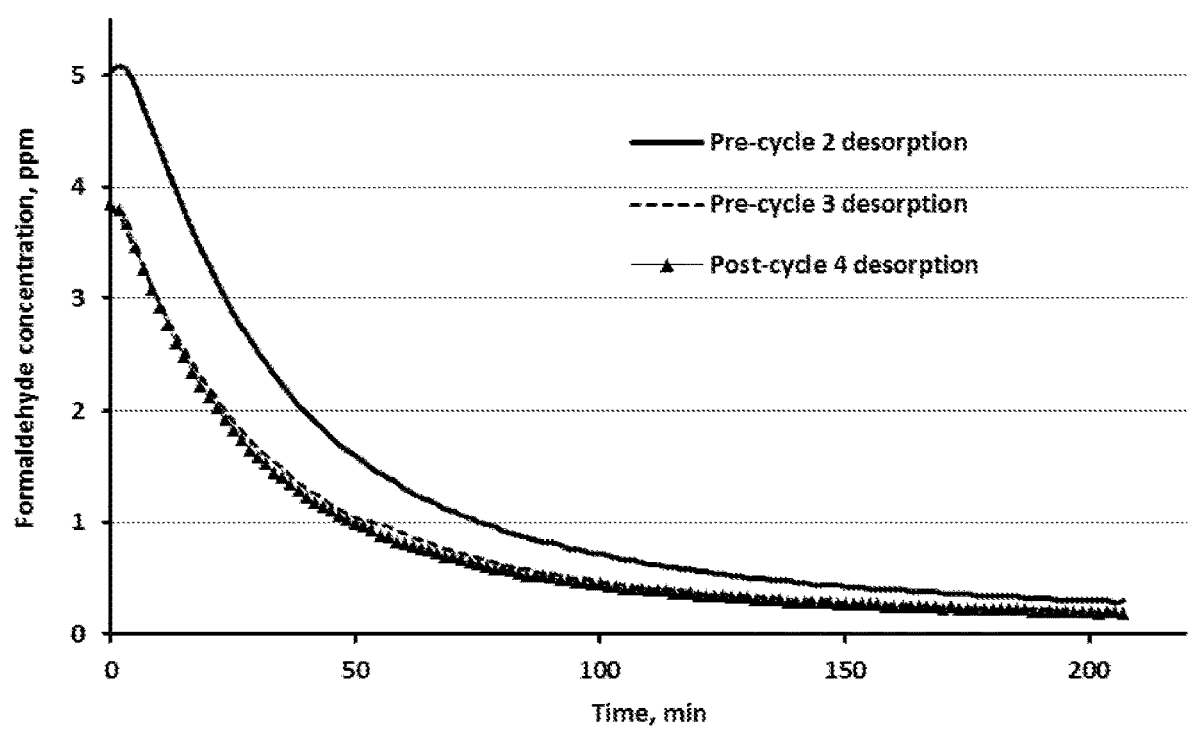
FIG. 5 depicts graphs of formaldehyde desorption as a function of time for an embodiment of the functionalized graphene sorbent of this invention, as observed during desorption cycles in the process of this invention.

FIG. 3 depicts formaldehyde break-through curves over four adsorption-three desorption cycles under the desorption conditions of Table 1. FIG. 4 depicts bar graphs of sorbent capacity from cycles 1 through 4. FIG. 5 depicts desorption curves plotting formaldehyde concentration in the effluent stream versus time for pre-cycles 2 and 3 and post-cycle 4. From cycles 1 to 2 we observed a decrease of approximately 23 percent in sorbent capacity; however, the sorbent capacity stabilized over subsequent cycles 2 to 4. The change in sorbent capacity from first to second cycles is believed to be in part due to settling of the sorbent powder under fixed bed testing conditions and gas flow channeling. Desorption of formaldehyde from the sorbent occurred at room temperature.

Example 3 (E-3)

The process of E-1 was repeated with the exception that the test conditions were as follows: 7.5 ppm formaldehyde in air; 1.4 slpm flow of contaminated air; and relative humidity increased from 10 percent to 40 percent. For the increased humidity, an aqueous solution of formaldehyde (37 wt. percent in water stabilized with 10-15 wt. percent methanol) was dispersed in an air stream with a syringe pump to yield the target inlet concentration of formaldehyde and water. The test employed the same pressure, temperature, and space velocity parameters as for the adsorption cycle used in E-1. The process was run through four adsorption-desorption cycles. Regeneration was effected at room temperature for cycles 2 and 3 and thermally at 150° C. for cycle 4.

Figure 6:
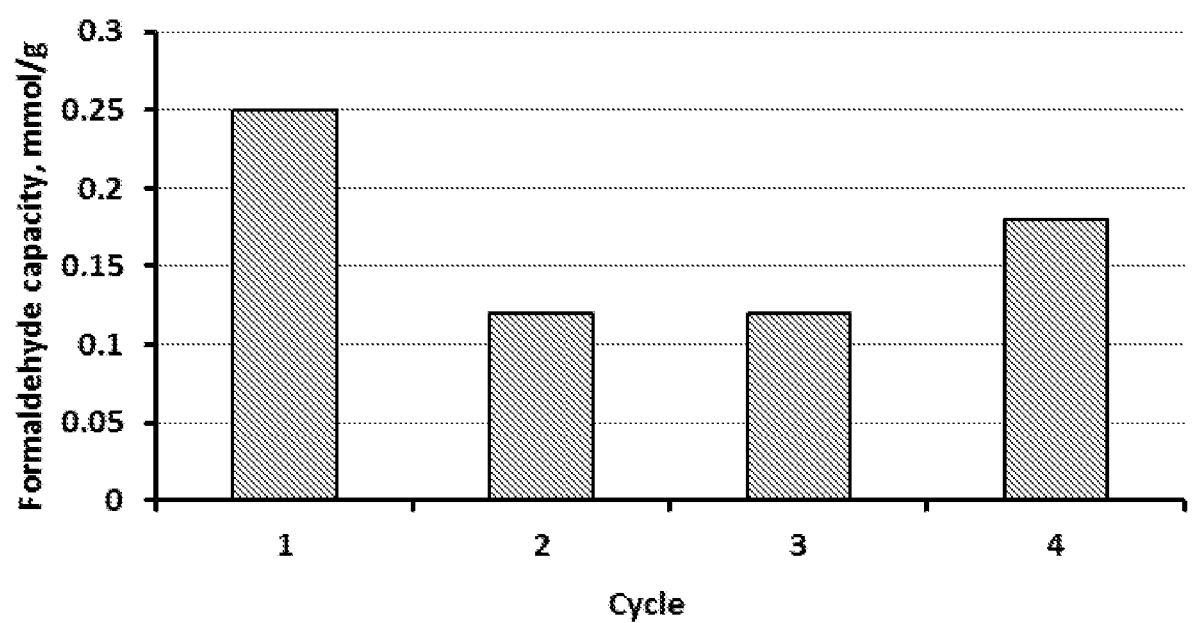
FIG. 6 depicts bar graphs of sorbent capacity of an embodiment of the functionalized graphene sorbent of this invention, as used in the process of this invention through four adsorption-desorption cycles at increased relative humidity.
Figure 7:
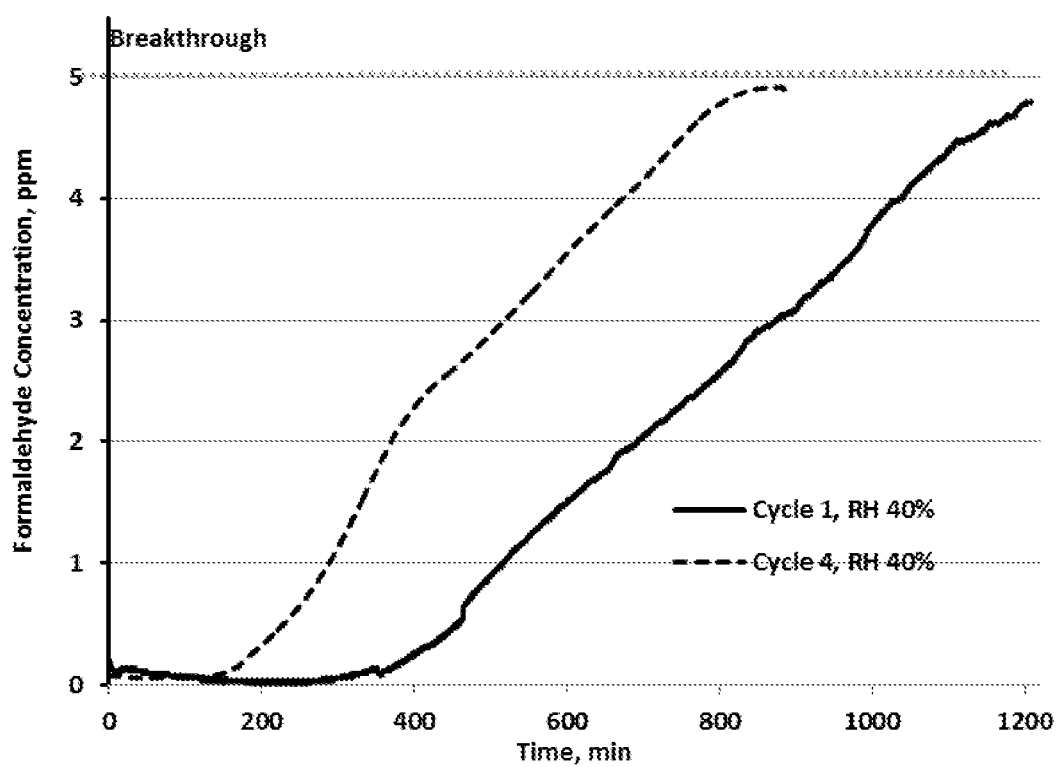
FIG. 7 depicts graphs of formaldehyde breakthrough as a function of time for two cycles of the process illustrated in FIG. 6.

Results are shown in FIG. 6 and FIG. 7. In cycle 1, as shown in FIG. 6, approximately the same capacity was measured at 40 percent relative humidity (0.0.25 mmol/g sorbent) as compared with the 10 percent relative humidity of E-1 (0.3 mmol/g sorbent). As seen, only 50 percent of the original sorbent capacity was recovered with room temperature air regeneration (cycles 2 and 3), while thermal regeneration at 150° C. (cycle 4) recovered approximately 70 percent of the original capacity. Formaldehyde is highly soluble in water; and water can also adsorb on the graphene surface. Thus, a certain degree of thermal regeneration appears to be beneficial under high humidity conditions to effect regeneration of the sorbent. Although at room temperature only 50 percent of the original sorbent capacity was recovered, this capacity was completely regenerated between cycles 2 and 3 indicating that post cycle 1 humidity driven capacity loss, a high degree of sorbent regenerability is achievable at room temperature. FIG. 7 illustrates formaldehyde breakthrough curves for Cycles 1 and 4.

Example 4 (E-4)

Figure 8:
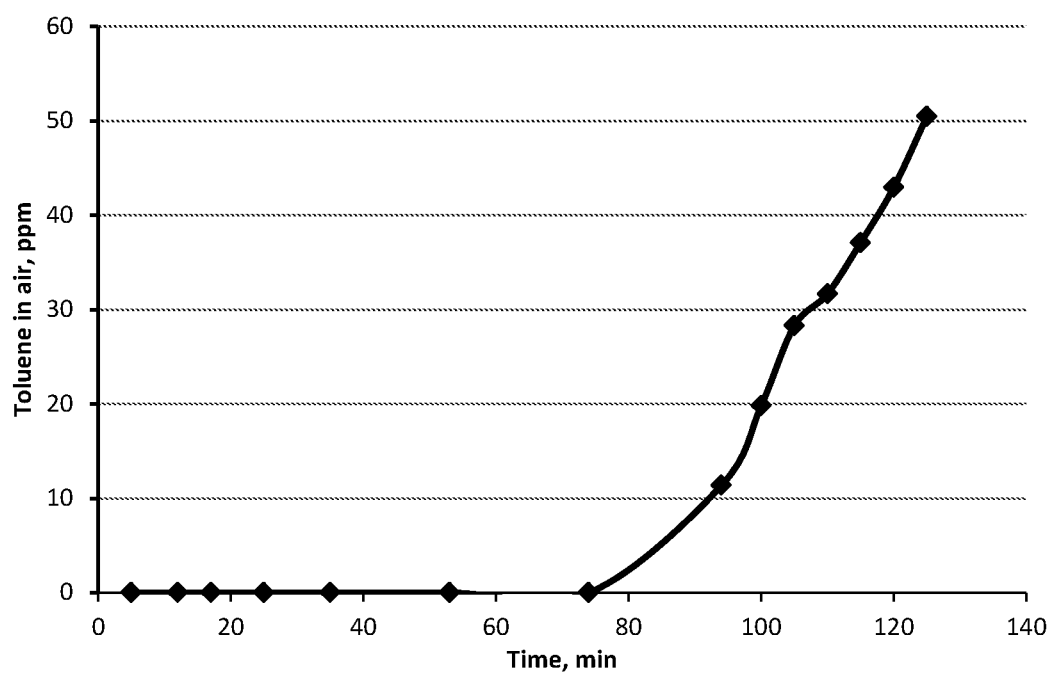
FIG. 8 depicts a graph of toluene breakthrough as a function of time for an embodiment of the process of this invention.

The sorbent of Example 1 was evaluated for sorbent capacity for toluene. The test rig of Example 1 was operated under the following conditions: 700 mg sorbent under a flow (0.75 SLPM) of air contaminated with toluene (100 ppm$_v$) at room temperature. Breakthrough was considered when the concentration of toluene at the outlet reached 50 percent of the inlet concentration (50 ppm$_v$). The sorbent capacity was observed to be 0.5 mmol toluene/g sorbent. A breakthrough curve is illustrated in FIG. 8.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A process of removing a volatile organic compound from a gaseous feedstream, comprising contacting the gaseous feedstream comprising an initial concentration of the volatile organic compound with a sorbent under adsorption conditions sufficient to produce an effluent stream comprising a reduced concentration of the volatile organic compound, as compared with the initial concentration; wherein the sorbent comprises a functionalized graphene prepared by a process comprising reacting graphene oxide with an amine of the formula NHR$_2$, wherein each R is independently selected from the group consisting of hydrogen, C$_{1-5}$ alkyl, and C$_{1-5}$ aminoalkyl, the reacting occurring under conditions sufficient to produce the functionalized graphene.

2. A process of removing a volatile organic compound from a gaseous feedstream, comprising contacting the gaseous feedstream comprising an initial concentration of the volatile organic compound with a sorbent under conditions sufficient to produce an effluent stream comprising a reduced concentration of the volatile organic compound, as compared with the initial concentration; the sorbent comprising a nitrogen and oxygen-functionalized graphene prepared by a process comprising contacting graphene oxide with an amine of the formula NHR$_2$, wherein each R is independently selected from the group consisting of hydrogen, C$_{1-5}$ alkyl, and C$_{1-5}$ aminoalkyl, the contacting occurring in the absence of a carbon nanotube and occurring under reaction conditions sufficient to produce the nitrogen and oxygen-functionalized graphene.

3. The process of claim 2 wherein the gaseous feedstream comprises air, and the volatile organic compound is an odoriferous compound, or irritant, or pollutant or contaminant in a concentration greater than 10 ppb$_v$ and less than 100 ppm$_v$.

4. The process of claim 2 wherein the gaseous feedstream comprises a waste gas stream from an industrial process, and wherein the volatile organic compound has a concentration in the waste gas stream of greater than 500 ppm$_v$ and less than 10,000 ppm$_v$.

5. The process of claim 2 wherein the volatile organic compound is a polar volatile organic compound having a dipole moment equal to or greater than 0.8 D.

6. The process of claim 2 wherein the volatile organic compound is selected from C$_{1-8}$ oxy-substituted hydrocarbons and C$_{1-8}$ halocarbons.

7. The process of claim 6 wherein the volatile organic compound is formaldehyde.

8. The process of claim 2 wherein the amine reacting with the graphene oxide is aqueous ammonia (ammonium hydroxide).

9. The process of claim 2 wherein the contacting of the gaseous feedstream with the sorbent is conducted at a temperature ranging from 5° C. to 50° C. and a pressure ranging from 1 atm (101 kPa) to 5 atm (506 kPa).

10. The process of claim 2 wherein the gaseous feedstream further comprises carbon dioxide.

11. The process of claim 2 wherein the gaseous feedstream has a relative humidity ranging from 0 percent to less than 80 percent.

12. The process of claim 2 wherein after the sorbent is saturated or partially saturated with the volatile organic compound, the process further comprises the step of desorbing the volatile organic compound; and thereafter the steps of adsorbing and desorbing are reiterated one or more times.

13. The process of claim 12 wherein the desorbing is effected by heating the sorbent, or by exposing the sorbent to a pressure gradient, or by passing a sweep gas through the sorbent.

14. The process of claim 13 wherein the desorbing is effected by passing a flow of air through the sorbent at a temperature ranging from 22° C. to less than 50° C.

15. The process of claim 2 wherein the contacting is conducted in a single fixed sorbent bed or conducted in a plurality of sorbent beds operating in swing mode.

16. The process of claim 2 wherein the sorbent is supported on a metal mesh substrate having an ultra-short-channel-length.

17. The process of claim 2 wherein the effluent stream comprises air or a waste gas stream containing a volatile organic compound in a concentration less than 50 $\text{ppm}_v$.

* * * * *